Figure 1:
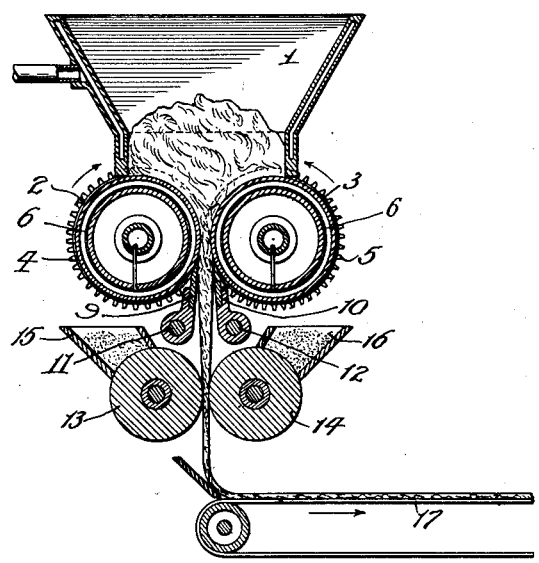

C. BARBIERI.
PROCESS OF MAKING SHEETS.
APPLICATION FILED AUG. 19, 1909.

968,110.

Patented Aug. 23, 1910.

UNITED STATES PATENT OFFICE.

CESARE BARBIERI, OF CHICAGO, ILLINOIS, ASSIGNOR TO BARBIERI & DELLENBARGER COMPANY, OF CHICAGO, ILLINOIS, A CORPORATION OF ILLINOIS.

PROCESS OF MAKING SHEETS.

968,110.  Specification of Letters Patent.  Patented Aug. 23, 1910.

Original application filed April 16, 1908, Serial No. 427,402. Divided and this application filed August 19, 1909. Serial No. 513,563.

*To all whom it may concern:*

Be it known that I, CESARE BARBIERI, a subject of the King of Italy, residing in the city of Chicago, in the State of Illinois, have invented certain new and useful Improvements in Processes of Making Sheets, of which the following is a specification.

This invention relates to processes for forming and handling sheets generally, and more particularly to the forming of sheets from resinous, gummy, sticky material and plastic substances such as gum chicle, gum caoutchouc, caramel, chocolate, taffy, cake and biscuit dough, and other confectionery and bakery goods, and the like, which under working conditions are sticky or both sticky and elastic.

It relates especially to processes for forming, by mechanical means, commercial sizes of sticks of gum chicle, colloquially known as chewing gum.

The principal objects of my invention are to produce sheets of gum chicle, mechanically, and particularly to produce continuous sheets of uniform thickness, width, consistency and weight, and without necessity of manual contact therewith by any person engaged in such production; to reduce the time required for such production and consequently cheapen the cost of production and enlarge the amount possible for a factory to produce; to produce sheets and sticks of more even and homogeneous texture and more uniform dimension, density and finish, and hence an article more merchantable; to improve by the use of machinery the conditions of hygiene under which such sheets are formed and finished, and thereby to preserve as far as possible the purity of the material and avoid the entrance of foreign matter into the sheets and any danger of contamination or infection thereof ensuant from hand manipulation.

As heretofore made, chewing gum has been manipulated largely by hand. The various processes and the steps incident to manufacture have necessitated that each sheet be subject to the operation of a considerable number of people. Such manufacturing has been conducted necessarily in order to maintain the sheets in plastic condition, under conditions of high temperature, and much to be desired in the way of hygienic conditions has been impossible to attain, owing to the fact that it has not been found commercially possible to make the sheets of gum by machinery and without manual processing, nor to produce continuous sheets.

I preferably carry out the steps of my improved process by means of a machine one exemplification of which I have illustrated diagrammatically in the accompanying drawings, wherein—

Figure 2:
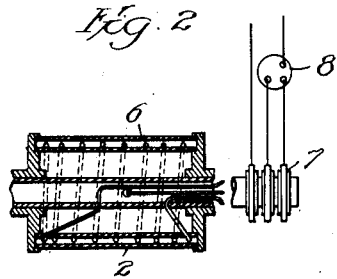

Figure 1 is a vertical section taken transversely through the machine; and Fig. 2 is a sectional detail of the heating means, employed by me therein, though the process may be practiced in other machines adaptable, or especially designed, for the purpose, a machine of the latter class being shown in my co-pending application Serial No. 427,402, of which this is a division.

The machine illustrated in the accompanying drawing comprises, briefly stated, the following mechanism, viz: a receptacle 1 for receiving the plastic mass to be formed into a sheet, which receptacle is preferably made hollow in order to provide a jacketing for the mass whereby the temperature and consistency thereof may be regulated by steam or hot water circulation or other heating apparatus; the feeding rolls 2 and 3 respectively carrying intermeshing gears 4 and 5, by which they may be rotated in the directions indicated by the arrows at substantially the same speed, such feeding rolls being provided with regulable heating means, here shown as a divided resistance coil 6, the unequal sections of which are so arranged with relation to the commutator 7 and a switch 8 that the heat of the rolls may be regulated as desired; the knife like cutters or removing devices 9 and 10 which are removably mounted in pivoted supporting members 11 and 12 respectively and are held with their edges in close contact with the surfaces of the rolls 2 and 3; the finishing rolls 13 and 14 adapted to smooth and compress, and, if desired, to reduce to any desired thickness the sheet as it passes downward from the rolls 2 and 3, the said rolls 13 and 14 being provided with a non-conducting surface such as enamel should it be desired that they be cooled externally, whereas they should be formed of a highly conducting material such as steel or copper if it be desired that they be cooled internally; hoppers 15 and 16 bearing respectively on the rolls 13 and 14, whereby powder may be supplied to the rolls and thence to the sheet of material in order to prevent the sheet from sticking to the parts through which it passes; and a horizontal belt conveyer 17 for carrying away the sheet in a continuous and flat form.

The manner in which the rotating rolls and other parts as just described are driven is unimportant, and it is to be understood that the rolls might be heated by non-machine elements, as by torches or hot water, or by the hot gum itself, in which latter case the gum would necessarily be heated to a higher temperature than normally, and would have to remain in the receptacle long enough to heat the rolls before the process could be successfully carried out, as I have found in practice that in order to feed the gum from the receptacle that it must be made to adhere to the rolls, and that when the rolls are below a certain predetermined temperature the gum in all cases fails to adhere so that it may be fed.

The adhering of the gum to the rolls necessitates the second step in the process, viz.: rotation of the rolls at substantially the same rate of speed so that the gum may be carried therebetween and against the cutters, and the cutting of the gum from the rolls as they rotate, in order to form the gum into a sheet as it emerges from between the rolls and cutters.

In forming some qualities or thicknesses of sheets, a third step is desirable, that is, causing the passage of the emerging sheet through a pair of finishing rolls which should be in vertical alinement with the feeding rolls. In this manner the sheet may be given a smooth finish, or a more compact surface, and may if desired be reduced to a predetermined thickness. If necessary suitable powder, such as powdered sugar where a sheet of gum chicle is being formed, may be applied to the rolls 13 and 14 in order to prevent the sheet from sticking thereto and becoming roughened or torn.

As the sheet emerges from the rolls between which it is formed or acted upon, I remove it by the belt conveyer 17, which may be of such length as may be necessary to accommodate the sheet produced, though in practice I find that the conveyer is preferably made of considerable length to the end that the sheet of material as it is conveyed thereby has sufficient time to harden in its finished form, so that it may be more firm and resistant before it is cut or subjected to further treatment.

It is to be observed that in order to prevent the tearing of the sheet, or the production of a sheet of very irregular form, or one that would be practically valueless for most purposes as a merchantable article, the rolls 2 and 3 must preferably be rotated at substantially the same speed, sufficient heat must be used to cause the gum to adhere to the rolls, and the knives must be well sharpened and bear continually on the rolls throughout substantially their entire length.

In practice I have found that the difficulties in handling a hot plastic mass of gum are very great, and that though it has heretofore been believed that the forming of sheets of gum chicle from a plastic mass was necessarily an expensive and unhygienic hand process incapable of being satisfactorily performed by a machine, I have by the machine illustrated and the process above described and hereinafter pointed out in my claims accomplished the production of such sheets mechanically in a manner which is entirely successful not only operatively but also economically and commercially.

Having thus described my invention and illustrated its use what I claim as new and desire to secure by Letters Patent is the following:

1. The process of forming a plastic mass of gum of a character adapted to become sticky and adhesive when heat is applied thereto into a sheet by the use of substantially horizontal spaced feed rollers, which consists in heating both of the rolls to such a temperature as will cause the gum to adhere thereto, rotating the rolls at substantially the same speed to carry forward between them in a sheet the gum adhering thereto, and cutting the sheet from the rolls on its emergence therefrom.

2. The process of forming a plastic mass of gum of a character adapted to become sticky and adhesive when heat is applied thereto into a sheet by the use of a pair of substantially horizontal spaced feed rollers, a pair of substantially horizontal spaced finishing rollers, and cutting means bearing on said feed rollers, which consists in causing the gum to adhere to both of the feed rollers by heat, rotating said rollers at substantially the same speed to carry the gum against said cutting means, cutting the gum from the rolls in the form of a sheet as it emerges from between said rolls and cutting means, and applying pressure to said sheet by said finishing rolls.

In testimony whereof I have hereunto signed my name in the presence of the two subscribed witnesses.

CESARE BARBIERI.

Witnesses:
PAUL CARPENTER,
DONALD C. WILLIAMS.